US006784245B2

(12) United States Patent
Buhring

(10) Patent No.: US 6,784,245 B2
(45) Date of Patent: Aug. 31, 2004

(54) HIGH-FREQUENCY WELDABLE AND LOW-TEMPERATURE FLEXIBLE POLYMER MIXTURE AND ITS USE

(75) Inventor: Jurgen Buhring, Burgwedel (DE)

(73) Assignee: Benecke-Kaliko AG, Hannover (DE)

( * ) Notice: Subject to any disclaimer, the term of this patent is extended or adjusted under 35 U.S.C. 154(b) by 0 days.

(21) Appl. No.: 10/252,065

(22) Filed: Sep. 20, 2002

(65) Prior Publication Data

US 2003/0113563 A1 Jun. 19, 2003

(30) Foreign Application Priority Data

Sep. 20, 2001 (DE) ......................................... 101 53 408

(51) Int. Cl.$^7$ .............................................. C08G 63/91
(52) U.S. Cl. ............................. 525/69; 525/80; 525/89; 525/94; 525/190
(58) Field of Search .............................. 525/80, 89, 94, 525/69, 190

(56) References Cited

U.S. PATENT DOCUMENTS

| 5,395,881 A | 3/1995 | Spelthann |
| 5,798,413 A | 8/1998 | Hausmann |

FOREIGN PATENT DOCUMENTS

| EP | 0703271 | 3/1996 | ........... C08L/23/08 |
| EP | 0 874 022 A1 | 10/1998 | |
| WO | 98/47958 | 10/1998 | ........... C08L/23/08 |
| WO | 99/05214 | 2/1999 | ........... C08L/51/06 |

OTHER PUBLICATIONS

European Search Report issued in connection with EP 1 295 909, corresponding European application to the above identified application, Jan. 2003.

Primary Examiner—Rachel Gorr
(74) Attorney, Agent, or Firm—Darby & Darby

(57) ABSTRACT

The invention concerns a high-frequency weldable and low-temperature flexible polymer mixture containing a copolymer of ethylene with a polar comonomer selected from the group of vinyl esters of saturated $C_2$–$C_8$ carboxylic acids, $C_1$–$C_{12}$ alkyl acrylates, and/or methacrylates, with the comonomer content being less than approximately 25% by weight, a terpolymer and/or copolymer of ethylene, propylene, and/or butylene, and a polar comonomer, with the comonomer content being less than approximately 25% by weight, and a thermoplastic polyolefin. The invention also provides a sheet or a molded piece containing the polymer mixture according to the invention and use thereof. Articles made with the polymer exhibit a high degree of low-temperature flexibility and favorable thermal stability together with sufficient high-frequency weldability and favorable welding seam strength.

46 Claims, No Drawings

HIGH-FREQUENCY WELDABLE AND LOW-TEMPERATURE FLEXIBLE POLYMER MIXTURE AND ITS USE

FIELD OF INVENTION

The invention concerns a high-frequency weldable and low-temperature flexible polymer mixture, a sheet or molded piece containing said polymer mixture, and the use thereof.

BACKGROUND OF INVENTION

PVC products have been used for technical applications for many years in the widest possible variety of products. Because of the trend toward reduction of chlorine-containing materials in all areas of life, there is an urgent need for halogen-free alternative products in the construction, automotive, and cable industries. Although EPDM rubbers constitute possible alternatives, they are frequently unsuitable due to cost considerations. For example, WO 93/19118 and WO 89/06256 describe halogen-free formulations that are suitable as cable insulating materials.

A frequent problem in the search for suitable halogen-free alternative products is the fact that while PVC sheets show quite favorable high-frequency welding properties, possible PVC substitute materials such as polyurethane sheets or thermoplastic polyolefin sheets known on the market cannot be welded.

Another property that plays a role in the automobile industry in particular is sufficient low-temperature flexibility of the material. A high degree of low-temperature flexibility is particularly important in cases where dynamic loads are imposed on materials at low temperatures. For example, polyolefin sheet materials are used as decorative materials for concealed air bag systems. In order for a material to be suitable for such an application, it must not become brittle at test temperatures (ordinarily −30° C.) or show high tensile strength, which could prevent the air bag lid from penetrating the decorative material. One must also ensure that the material does not shatter because of its brittleness since the resulting fragments could injure vehicle occupants. Brittleness of the material must therefore be avoided, and one must ensure that the air bag opens as desired at low temperatures (without flying particles).

A high degree of low-temperature flexibility is also important for a material used in covers for cargo areas, for example, which may be in the form of sheet-type or rolling covers which must roll up and down without problems at cold temperatures.

At the same time, thermal stability of the material at a temperature of at least 100° C. is a requirement for applications in automobiles or other motor vehicles. In this case, thermal stability means that the surface structure or grain of the material must remain intact after storage for several days at the test temperature without showing any increased gloss. Moreover, static elongation at this temperature must be low.

There have been several proposals in prior art for meeting the above requirements:

For example, EP 998-528 discloses non-flammable halogen-free polymer compositions composed of a mixture of ethylene-vinyl acetate-carbon monoxide terpolymer with two additional components selected from ethylene vinyl acetate or polyethylene and an inorganic filler that must show favorable heat resistance.

EP 0-703-271-A1 describes a halogen-free thermoplastic polyolefin composition that is flexible at room temperature. The materials used in this composition include ethylene vinyl acetate copolymers and extremely low-density polyethylene. Although these formulations are often useful for many applications, they have the drawback of showing insufficient heat resistance when exposed to temperatures >80° C.

Moreover, EP 0-977-807 discloses a halogen-free polymer mixture that is flexible at room temperature and shows greater thermal stability than the invention of EP 0-703-271. However, these two compositions do not provide a favorable combination of low-temperature flexibility and sufficiently high thermal stability.

It is known that sufficient low-temperature flexibility can be achieved for a material by including correspondingly soft components. But as this results in insufficient thermal stability, no satisfactory results have yet been obtained by this method. There are currently no solutions that provide a high-frequency weldable polyolefin sheet as a substitute for a PVC sheet, e.g. for the applications mentioned above.

BRIEF DESCRIPTION OF THE INVENTION

The purpose of the invention is therefore to provide a halogen-free polymer mixture that does not have the drawbacks described above in order to provide a sufficient degree of high-frequency weldability and favorable weld seam strength with simultaneous high low-temperature flexibility and favorable thermal stability.

The invention achieves this purpose by forming a high-frequency weldable and low-temperature flexible polymer mixture, containing a) approximately 1 to 30% by weight of a copolymer with ethylene and a polar comonomer selected from the group of vinyl esters of saturated $C_2$–$C_8$ carboxylic acids, $C_1$–$C_{12}$ alkyl acrylates, and/or methacrylates, with the copolymer having an MFI (melt flow index) (according to DIN 53,735; 190° C., 2.16 kg) of approximately 0.1 to 30 g/10 min, and preferably approximately 0.5 to 10 g/10 min, and a comonomer content of less than approximately 25% by weight, and preferably less than approximately 19% by weight;

b) approximately 1 to 40% by weight of components b1) and/or b2), selected from:

b1) a terpolymer, with one monomer each being selected from one of the following three groups:
  (1) ethylene, propylene, and/or butylene,
  (2) the group of vinyl esters of saturated $C_2$–$C_8$ carboxylic acids, $C_1$–$C_{12}$ alkyl acrylates, and/or methacrylates, and
  (3) carbon monoxide and/or glycidyl acrylate or methacrylate,
  with the content of monomer (1) being approximately 30 to 90% by weight, the content of monomer (2) being approximately 10 to 70% by weight, and the content of monomer (3) being approximately 1 to 20% by weight, and the MFI (190° C., 2.16 kg) of the terpolymer being between approximately 0.1 and 30 g/10 min, or b2) a copolymer, with one monomer each being selected from one of the following two groups:
  (1) ethylene, propylene, and/or butylene, and
  (2) the group of vinyl esters of saturated $C_2$–$C_8$ carboxylic acids, $C_1$–$C_{12}$ alkyl acrylates, and/or methacrylates;
  with an MFI (190° C., 2.16 kg) of approximately 0.1 to 30 g/10 min and a comonomer content of more than approximately 25% by weight, and c) approximately 35 to 75% by weight of a thermoplastic polyolefin with a melting point above approximately 115° C., selected from the group of ethylene homopolymers, ethylene copolymers, propylene homopolymers, and propylene copolymers or mixtures thereof, with this polymer being optionally grafted with approximately 0.1 to 7% by weight, preferably approximately 0.5 to 5% by weight, and particularly preferably approximately 0.05 to 3% by weight of an unsaturated carboxylic acid, unsaturated dicarboxylic acid, or esters and/or anhydrides thereof, with the amounts of a) through c) totaling 100% by weight, and the percentage of components a)+b1) or a)+b2), with respect to the total amount of the polymer mixture, being 50% by weight or less. The lower limit for the percentage of components a) +b1) or a) +b2) is approximately 25% by weight, as high-frequency weldability might otherwise be impaired.

The invention therefore provides a polymer mixture in the form of a composition tailored to the desired application that essentially comprises three components and shows the required set of characteristics. On the one hand, polar polymers are included that enable high-frequency weldability, support increased low-temperature flexibility, and provide a high degree of static elongation. These polymers containing polar groups are used in a maximum amount of 50% by weight. Surprisingly, the above polymer mixture also provides increased temperature stability, but without impairing weldability and outstanding low-temperature flexibility, and sufficiently low static elongation at elevated temperature is also ensured.

DETAILED DESCRIPTION OF THE INVENTION

The following is a description of the individual components:

Component a) according to the invention contains a copolymer of ethylene with a polar comonomer. The MFI (according to DIN 53,735; 190° C., 2.16 kg) of the copolymer is in the range of approximately 0.1 to 30 g/10 min, and preferably approximately 0.5 to 10 g/10 min. Examples of suitable polar comonomers include vinyl esters of saturated $C_2$–$C_8$ carboxylic acids, $C_1$–$C_{12}$ alkyl acrylates, and/or methacrylates. Preferred examples are ethylene-vinyl acetate copolymer, ethylene-methyl acrylate copolymer, ethylene-ethyl acrylate copolymer, and/or ethylene-butyl acrylate copolymer. The comonomer content is set at less than approximately 25% by weight, and preferably less than approximately 19% by weight. Particularly preferred examples are ethylene-vinyl acetate copolymer with a vinyl acetate content of less than approximately 25% by weight, and preferably less than approximately 19% by weight, and ethylene-methyl acrylate copolymer with a methyl acrylate content of less than approximately 25% by weight, and preferably less than approximately 19% by weight.

In addition to component a), a component b) is included that comprises the alternative possibilities b1) and/or b2):

For example, a terpolymer (component b1)) may be used that is composed of monomer (1): ethylene, propylene, and/or butylene, monomer (2): one or more of the aforementioned comonomers, and monomer (3): carbon monoxide, glycidyl acrylate and/or methacrylate, with the individual monomer units being statistically distributed over the polymer chain.

The content of monomer (1) is approximately 30 to 90% by weight, and preferably approximately 40 to 80% by weight, with an amount of approximately 50 to 75% by weight being particularly preferred. Monomer (2) is present in an amount of approximately 10 to 70% by weight, and preferably approximately 10 to 50% by weight, with an amount of approximately 15 to 35% by weight being particularly preferred. Monomer (3) is used in an amount of approximately 1 to 20% by weight, and preferably approximately 2 to 15% by weight, with an amount of approximately 3 to 12% by weight being particularly preferred. The MFI (190° C., 2.16 kg) of the terpolymer is between approximately 0.1 and 30 g/10 min, and preferably between approximately 0.1 and 15 g/10 min, with a value of approximately 0.5 to 10 g/10 min being particularly preferred.

According to a particularly preferred embodiment, the terpolymer b1) is an ethylene-vinyl acetate-carbon monoxide terpolymer. The inclusion of carbon monoxide provides advantages with respect to high-frequency weldability, so that the amount of polymers containing polar groups can be substantially reduced with respect to components a) or b).

Alternatively, instead of the terpolymer described above, one may use a copolymer b2) of ethylene, propylene, and/or butylene with the above-described comonomers. According to the invention, this copolymer has an MFI (190° C., 2.16 kg) of approximately 0.1 to 30 g/10 min. In this case, the comonomer content is set at above approximately 25% by weight. For example, the copolymer of component b2) may be an ethylene-vinyl acetate copolymer with a vinyl acetate content of more than approximately 35% by weight or an ethylene-methyl acrylate copolymer with a methyl acrylate content of more than approximately 35% by weight.

In individual cases, it may be preferable that the composition not contain an inorganic filler in the case of an ethylene-vinyl acetate-carbon monoxide terpolymer with 30 to 90% by weight of ethylene, 10 to 70% by weight of vinyl acetate, and 1 to 40% by weight of carbon monoxide, and an ethylene-vinyl acetate copolymer with 25 to 90% by weight of ethylene and 10 to 75% by weight of vinyl acetate. Furthermore, it is preferable that the composition not contain ethylene-vinyl acetate with 30 to 90% by weight of ethylene and 10 to 70% by weight of vinyl acetate in the case of an ethylene-vinyl acetate-carbon monoxide terpolymer with 30 to 90% by weight of ethylene, 10 to 70% by weight of vinyl acetate, and 1 to 20% by weight of carbon monoxide and a polyolefin selected from the group consisting of an LLDPE with a specific density above 0.925, an LDPE with a specific density above 0.920, an HDPE, a polypropylene homopolymer, and/or an ethylene-propylene copolymer.

It may also be preferable that the mixture not contain LLDPE with a specific density of less than 0.920 if ethylene-vinyl acetate with 30 to 90% by weight of ethylene and 10 to 70% by weight of vinyl acetate is used.

According to a preferred embodiment of the invention, the percentage of component a) with respect to the total mixture is between approximately 3 and 20% by weight, preferably between approximately 5 and 15% by weight, and the percentage of component b) with respect to the total mixture should be between approximately 5 and 30% by weight, and preferably between approximately 5 and 25% by weight, with a percentage of between approximately 10 and 20% by weight being preferred.

The polymer mixture according to the invention contains as component c) a thermoplastic polyolefin that has a melting point above approximately 115° C. The polyolefin used may be selected from the group of ethylene homopolymers, ethylene copolymers, propylene homopolymers, and propylene copolymers and mixtures thereof. Suitable comonomers, in addition to those mentioned above for component a), also include $C_3$–$C_{12}$-α olefins for polyethylene and/or $C_2$- and $C_4$–$C_{12}$-α olefins for polypropylene. In addition, the corresponding graft polymers may also be used. Moreover, the polymer may optionally be grafted with approximately 0.1 to 7% by weight, and preferably approximately 0.5 to 5% by weight of (di-) carboxylic acid and/or derivatives thereof, with an amount of 0.5 to 3% by weight being particularly preferred. Unsaturated carboxylic acids or unsaturated dicarboxylic acids, as well as esters and/or anhydrides thereof, may be used as graft monomers. Examples of unsaturated carboxylic acids or derivatives thereof include acrylic acid, methacrylic acid, maleic acid, maleic anhydride, and fumaric acid. Ethylene homo- or copolymers grafted with maleic anhydride are particularly preferred. Mixtures of these polymers or graft polymers may also be used.

According to one embodiment, the thermoplastic polyolefin is an optionally grafted ethylene homopolymer or copolymer having a density above approximately 0.910 g/L, and preferably above approximately 0.920 g/L. This substance has an MFI (190° C., 2.16 kg) of approximately 0.1 to 30 g/10 min, and preferably 0.5 to 10 g/10 min, with an index of 0.5 to 7 g/10 min particularly preferred.

In a further variant of the invention, the thermoplastic polyolefin of component c) is an optionally grafted polypropylene from the group of homopolymers and block or random copolymers with $C_2$- or $C_4$- to $C_{12}$-α olefins as comonomers. For example, this propylene copolymer may also be a segmented block copolymer in which the polypropylene blocks are flanked by statistical copolymer blocks on either side or a statistical copolymer block is flanked by polypropylene blocks on either side.

The polypropylenes and polyethylenes may be grafted with a rubber or form a block copolymer with said rubber.

Examples of α-olefins include ethene, 1-butene, 1-pentene, 1-hexene, 1-octene, and/or 4-methyl-pentene-1, with the amount in the thermoplastic polyolefin being approximately 0.1 to 25% by weight, and preferably approximately 0.1 to 10% by weight of α-olefins. In this case, the density of the polypropylene is usually above approximately 0.90 g/L. As a rule, the melting point is above approximately 120° C. The MFI should be between approximately 0.1 and 30 g/10 min, and preferably approximately 0.3 to 20 g/10 min, with a value of approximately 0.3 to 7 g/10 min (230° C., 2.16 kg) being particularly preferred.

According to a third alternative for component c) according to the invention, non-crosslinked or partially or completely crosslinked thermoplastic polyolefin elastomers are selected that contain approximately 10 to 77% by weight of propylene homopolymer or copolymer and approximately 23 to 90% by weight of a copolymer, based on ethylene and 1 or more $C_3$–$C_{12}$-α olefins, and optionally, a non-conjugated diene.

Suitable non-conjugated dienes include linear aliphatic dienes such as 1,4-hexadiene, alkylidene bicycloalkenes such as 5-ethylidene-2-norbornene, alkenyl bicycloalkenes such as 5-alkenyl-2-norbonene, bicycloalkadienes such as bicyclopentadiene, and alkenyl cycloalkenes such as vinyl cyclohexene, or direactive non-conjugated dienes such as 2,5-norbornadiene or 1,6-octadiene.

In the present description, "non-crosslinked or partially or completely crosslinked thermoplastic polyolefin elastomers" should be understood to mean polymeric mixtures of polyolefin(s) with rubber that may be correspondingly crosslinked. In the aforementioned crosslinked polyolefin-elastomer systems, the gel content should be set at approximately 5 to 80%, and preferably approximately 5 to 60%, with a content of 5 to 40% being particularly preferred. This provides the advantage of a specified phase morphology of the rubber phase and the advantage that increased amounts of soft polymer components that improve low temperature flexibility do not impair temperature stability because of crosslinking. Preferably, the ethylene copolymer of component c) should have a glass transition temperature of less than approximately −20° C.

In a further embodiment of the invention, an ethylene copolymer having a melting point of approximately 65° C. to 110° C. and/or a density of approximately 0.86 g/L to 0.91 g/L is also used. The maximum concentration of this ethylene copolymer should be 30% by weight, and preferably 5 to 20% by weight. Examples of suitable comonomers include $C_4$- to $C_{12}$- and preferably $C_4$- to $C_8$-α olefins. The addition of these substances is particularly advantageous, as this improves weldability.

It is of critical importance to maintain the indicated MFI values of the components, because the softened mass must show sufficient strength during the manufacturing process to be machine-treatable. On the other hand, the polymer mixture must show sufficient flowability during the welding process.

In addition, the polymer mixture according to the invention may also include additives in amounts that do not substantially affect high-frequency weldability. Examples of fillers include calcium carbonate, calcium silicate, talc, silica, mica, and aluminum oxide. The fillers may be used in an amount of up to 30% by weight with respect to the amount of polymer components. Other additives, such as antiblocking agents, lubricants, light-stability agents, antioxidants, dyes, pigments, flame retardants, antistatic agents, or crosslinking auxiliaries, may also be added. The additives are ordinarily used in amounts of up to 30% by weight with respect to the amount of the polymer components.

In a particularly advantageous embodiment of the invention, aliphatic and/or naphthenic processing aids are used in an amount of approximately 1 to 10% by weight, and preferably approximately 1 to 8% by weight, with an amount of approximately 1 to 5% by weight being particularly preferred, said processing aids being liquid at room temperature and taking on a waxlike consistency only at temperatures of less than approximately 0° C. Examples include white mineral oil (low-molecular-weight aliphatic compounds).

The polymer mixture according to the invention may be manufactured as follows. Preferably, the granulated raw materials are mixed at a low temperature, added to an extruder, such as a twin-screw extruder, and then plasticized. This material is discharged via a slit dye to form a film material (sheet) and then taken up by subsequent devices. For example, molded pieces may be obtained from the sheet by deep drawing.

Accordingly, the purpose of the invention is to provide a sheet or molded piece containing the polymer mixture according to the invention, which can be manufactured by the usual processes.

It is possible to crosslink the sheet or molded piece after forming, but this is not necessary in order to achieve the purpose of the invention. If crosslinking is desired, this can be carried out by means of electrons or gamma rays. After crosslinking, the entire gel content should be between approximately 5 and 80%, and preferably between approximately 10 and 70%, with an amount of between approximately 20 and 60% being particularly preferred.

The sheet, such as a soft sheet, or the molded piece should preferably be used in the automobile industry, in air bag covers, roof linings, head rests, arm straps, hat racks, seat and back cushion covers and rear coverings of front seats, sun visors, floor protectors, door side coverings, or cargo space covers. This material may also be used in trunk linings, book bindings, etc.

In a preferred embodiment as a cargo area cover, the sheet may consist of an upper and lower sheet, a support lying between them, and if applicable, additional sheets and layers, with said upper and lower sheets containing the polymer mixture of the invention.

The advantages of the invention are multifaceted. For example, compared to the prior art described above, the polymer mixture according to the invention possesses a surprising combination of properties. The compositions show outstanding low temperature flexibility, thus making it possible to provide sheets or molded pieces that can be subjected to high dynamic loads at low temperatures without shattering. At the same time, this ensures sufficient high-temperature stability. An essential characteristic of the polymer mixture according to the invention is its high-frequency weldability, which makes it suitable for applications that were not possible using the systems known from prior art.

A particular advantage lies in the fact that the invention makes it possible, for example, to implement new designer elements with halogen-free two-colored or multi-colored sheets, thus meeting the standards of the automobile industry in an outstanding manner.

Thus the polymer mixture according to the invention enables selective control of properties in order to provide a composition tailored to the application in question.

In the following, the invention will be described in detail based on examples that do not limit the invention. Further embodiments within the framework of the invention will be obvious to a person skilled in the art.

EXAMPLES

In examples, the following substances are used:

EVA 1 Ethylene-vinyl acetate copolymer, MFI=0.4 g/10 min (190° C., 2.16 kg). Vinyl acetate content: 17% by weight;

EVA 2 Ethylene-vinyl acetate copolymer, MFI=2 g/10 min (190° C., 2.16 kg). Vinyl acetate content: 25% by weight;

EVA 3 Ethylene-vinyl acetate copolymer, MFI=3 g/10 min (190° C., 2.16 kg). Vinyl acetate content: 40% by weight;

EVA 4 Ethylene-vinyl acetate copolymer, MFI=0.7 g/10 min (190° C., 2.16 kg). Vinyl acetate content: 18% by weight;

EMA Ethylene-methyl acrylate copolymer, MFI=2 g/10 min (190° C., 2.16 kg), methyl acrylate content: 18% by weight EVACO Ethylene-vinyl acetate-carbon monoxide terpolymer, MFI=15 g/10 min (190° C., 2.16 kg), vinyl acetate content: 20% by weight, carbon monoxide content 8% by weight;

EGB Ethylene-butyl acrylate-glycidyl methacrylate terpolymer, MFI=12 g/10 min (190° C., 2.16 kg). Butyl acrylate content: 28% by weight, glycidyl ether content 5% by weight;

PE 1 LLDPE with a density of 0.93 g/L and an MFI of 5 g/10 min (190° C., 2.16 kg);

PE 2 VLDPE with a density of 0.87 g/L and an MFI of 5 g/10 min (190° C., 2.16 kg);

PE 3 LDPE with a density of 0.92 g/L and an MFI of 0.8 g/10 min (190° C., 2.16 kg);

PE 4 LLDPE with a density of 0.92 g/L and an MFI of 1 g/10 min (190° C., 2.16 kg);

PE 5 HDPE with a density of 0.958 g/L and an MFI of 1.5 g/10 min (190° C., 2.16 kg);

PP Random PP with an ethylene content of approximately 3% by weight and an MFI of 0.8 g/10 min (230° C., 2.16 kg);

TPE-O 1 Containing approximately 65% of an ethylene-propylene copolymer whose ethylene content is approximately 70% by weight and approximately 35% by weight of a propylene-ethylene copolymer whose ethylene content is approximately 3% by weight. The MFI is approximately 1.8 g/10 min (230° C., 2.16 kg);

TPE-O 2 Containing approximately 55% of an ethylene-propylene copolymer whose ethylene content is approximately 50% by weight and approximately 45% by weight of a propylene-ethylene copolymer whose ethylene content is <1% by weight. The MFI is approximately 1.2 g/10 min (230° C., 2.16 kg), and TPE-V Containing 55% EPDM and 45% of a propylene. The MFI is approximately 12 g/10 min (230° C., 2.16 kg), and the gel content is approximately 30%.

Comparison Example 1

20% by weight of LLDPE, 40% by weight of TPE-O 2, 10% by weight of PP, and 30% by weight of a VLDPE are mixed in a drum mixer and then extruded at 190° C. in a twin-shaft extruder into a sheet 0.5 mm in thickness. Two sheets are welded together at room temperature on a high-frequency welding unit with a G4000 SD generator and a KH500 press, both manufactured by Kiefel. The following welding parameters were selected:

| Welding pressure: | 1600 N |
|---|---|
| Welding time: | 4 sec |
| Welding voltage: | 2100 V |
| Electrode: | 150 × 5 mm |

The physical and mechanical properties of the sheets and the welding seams are summarized in Table 1.

Comparison Examples 1–8 and Examples 1–10

The components shown in Tables 1 and 2 were mixed. Sheet manufacturing was carried out in the same manner as in Example 1. Homogeneous sheets having the properties shown in Tables 1 and 2 were obtained.

The sheet according to Comparison Example 1 shows the properties of a marketable TPO sheet that is not HF-weldable. For example, moreover, its low-temperature flexibility, as expressed by stress at 5% elongation [in MPa], is insufficient at 18 MPa to allow a luggage space covering sheet to be reliably rolled into place.

The sheets according to Comparison Examples 2 through 4 have been taken from the examples of WO 98/47958 (EP 977,807). These show sufficiently favorable high-frequency weldability, but either low-temperature flexibility or stability at high temperatures is lacking, i.e., when high-temperature stability is sufficient, sufficient low-temperature flexibility cannot be achieved, and when high low-temperature flexibility is sufficient, sufficient high-temperature stability cannot be achieved.

The sheet according to Comparison Example 5 shows a significant decrease in its mechanical properties, without the addition of EVA, with a VAc content of <25% and limitations on its surface properties.

The sheet according to Comparison Example 6 shows that the total content of polar polymers should preferably be >25% by weight in order to achieve high-frequency weldability.

The sheets according to Comparison Example 7 and 8 demonstrate that thermal stability is insufficient when high percentages of VLDPE or LDPE are present in the formulation.

TABLE 1

|  | Comparison Example 1 | Comparison Example 2 | Comparison Example 3 | Comparison Example 4 | Comparison Example 5 | Comparison Example 6 | Comparison Example 7 | Comparison Example 8 |
|---|---|---|---|---|---|---|---|---|
| EVA 1 |  |  |  |  |  | 10 | 15 | 15 |
| EVA 2 |  | 16.5 | 16.5 | 16.5 |  |  |  |  |
| EVA 3 |  | 5 | 5 | 5 |  |  |  |  |
| EVA 4 |  | 16.5 | 16.5 | 16.5 |  |  |  |  |
| EVACO |  | 31 | 31 | 31 | 40 | 15 | 25 | 25 |
| PE 1 | 20 |  |  |  | 60 | 75 |  |  |
| TPE-O1 |  |  |  |  |  |  |  |  |
| TPE-O2 | 40 |  |  |  |  |  |  |  |
| TPE-V |  |  |  |  |  |  |  |  |
| PP | 10 |  |  | 31 |  |  |  |  |
| PE 2 | 30 | 31 |  |  |  |  | 60 |  |
| PE 5 |  |  | 31 |  |  |  |  |  |
| PE 3 |  |  |  |  |  |  |  | 60 |
| Extrusion behavior | OK | OK | OK | OK | Sticky surface | OK | OK | OK |
| Rupture strength [MPa] | n.m. | n.m. | n.m. | n.m. | n.m. | n.m. | 18 | 18 |
| Elongation at rupture [%] | n.m. | n.m. | n.m. | n.m. | n.m. | n.m. | 700 | 700 |
| Stress at 5% elongation [MPa] −30° C. | 17 | 9 | 19 | 22 | 23 | n.m. | 4 | 17 |
| Rupture strength [MPa]−30° C. | 49 | 56 | 48 | 51 | 21 | n.m. | 47 | 37 |
| Elongation at rupture [%]−30° C. | 450 | 460 | 390 | 400 | 240 | n.m. | 430 | 400 |
| AF weldability | Not OK | OK | OK | OK | OK | Not OK | OK | OK |
| Peeling force [N] | — | n.m. | n.m. | n.m. | n.m. | — | 50 | n.m. |
| Thermal expansion 110° C., 1 h[%] | 1 | >10 | >10 | >10 | 2 | 0 | >10 | >10 |
| Surface change after 24 h, 100° C. | None | Gloss, grain flattened | Gloss, grain flattened | None | None | None | Gloss, grain flattened | Gloss, grain flattened |

TABLE 2

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| EVA 1 | 19 | 10 | 10 | 10 | 15 | 15 | 10 | 15 | 10 |  |
| EVA 2 |  |  |  |  |  |  |  |  |  |  |
| EVA 3 |  | 10 | 15 |  | 15 | 15 | 10 | 15 | 10 |  |
| EMA |  |  |  |  |  |  |  |  |  | 10 |
| EVACO | 30 | 15 | 15 | 30 | 20 | 20 | 15 | 25 |  | 30 |
| EGB |  |  |  |  |  |  |  |  | 15 |  |
| PE 1 |  | 30 |  |  | 20 | 40 | 30 | 45 | 40 |  |
| TPE-O1 |  | 10 |  |  | 30 | 10 | 20 |  | 20 |  |
| TPE-O2 |  |  | 60 | 60 |  |  |  |  |  | 60 |
| TPE-V |  | 25 |  |  |  |  |  |  |  |  |
| Rubber |  |  |  |  |  |  |  |  |  |  |
| PP |  |  |  |  |  |  |  |  |  |  |
| PE 2 |  |  |  |  |  |  |  | 15 |  |  |
| PE 4 | 51 |  |  |  |  |  |  |  |  |  |
| Extrusion behavior | OK | OK | OK | OK | OK | OK | OK | OK | OK | OK |
| Rupture strength [MPa] | n.m. | 14 | 16 | n.m. | n.m. | 18 | 17 | 17 | n.m. | n.m. |
| Elongation at rupture [%] | n.m. | 740 | 670 | n.m. | n.m. | 1010 | 660 | 1020 | n.m. | n.m. |
| Stress at 5% elongation [MPa] −30° C. | 16 | 11 | 13 | 11 | 14 | 16 | 12 | 16 | 14 | 11 |

TABLE 2-continued

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Rupture strength [MPa]-30° C. | 47 | 29 | 45 | 43 | 46 | 33 | 37 | 30 | 31 | 40 |
| Elongation at rupture [%]-30° C. | 490 | 410 | 400 | 460 | 480 | 430 | 420 | 410 | 410 | 430 |
| AF weldability | OK | OK | OK | OK | OK | OK | OK | OK | OK | OK |
| Peeling force [N] | 53 | 42 | 37 | 45 | 56 | 52 | 63 | 45 | 40 | 47 |
| Thermal expansion 110° C., 1 h[%] | 5 | 3 | 2 | 2 | 4 | 2 | 4 | 2 | 3 | 2 |
| Surface change after 24 h, 100° C. | None | None | None | None | None | None | None | None | None | None |

Abbreviations used in the table:
Not OK = Not OK
OK = OK
n.m. = Not measured

Stress at rupture [MPa] and elongation at rupture [%] were determined based on ISO 527/3. The strength of the welding seams was tested by measuring peeling force in accordance with DIN 53357 in a longitudinal direction. The tension values at 5% elongation were used to measure the low-temperature flexibility or stiffness of the materials. This testing was conducted based on ISO 527/3.

The sheets according to the invention mentioned in Examples 1–10, on the other hand, combine satisfactory physical and mechanical properties of the sheet, favorable production properties, favorable high-frequency weldability, sufficiently high thermal stability, and outstanding properties with respect to low-temperature flexibility.

What is claimed is:

1. High-frequency weldable and low-temperature flexible polymer mixture, comprising:
    a) from about approximately 1 to about 30% by weight of a copolymer with ethylene and a polar comonomer selected from the group of vinyl esters of saturated $C_2$–$C_8$ carboxylic acids, $C_1$–$C_{12}$ alkyl acrylates, and/or methacrylates, with the copolymer having an MFI (according to DIN 53,735; 190° C., 2.16 kg) of approximately 0.1 to 30 g/10 min and a comonomer content of less than approximately 25% by weight;
    b) from about approximately 1 to about 40% by weight of components b1) and/or b2), selected from:
        b1) a terpolymer, with one monomer each being selected from one of the following three groups:
        (1) ethylene, propylene, and/or butylene,
        (2) the group of vinyl esters of saturated $C_2$–$C_8$ carboxylic acids, $C_1$–$C_{12}$ alkyl acrylates, and/or methacrylates, and
        (3) carbon monoxide and/or glycidyl acrylate or methacrylate,
            with the content of monomer (1) being from about 30 to about 90% by weight, the content of monomer (2) being from about 10 to about 70% by weight, and the content of monomer (3) being from about 1 to about 20% by weight, and the MFI (190$^N$C, 2.16 kg) of the terpolymer being between from about 0.1 and about 30 g/10 min, or
        b2) a copolymer, with one monomer each being selected from one of the following two groups:
        (1) ethylene, propylene, and/or butylene, and
        (2) the group of vinyl esters of saturated $C_2$–$C_8$ carboxylic acids, $C_1$–$C_{12}$ alkyl acrylates, and/or methacrylates;
            with an MFI (190$^N$C, 2.16 kg) of from about 0.1 to about 30 g/10 min and a comonomer content of more than about 25% by weight, and
    c) from about approximately 35 to about 75% by weight of a thermoplastic polyolefin with a melting point above about 115$^N$C, selected from the group of ethylene homopolymers, ethylene copolymers, propylene homopolymers, and propylene copolymers or mixtures thereof, with this polymer being optionally grafted with from about 0.1 to about 7% by weight, and preferably 0.5 to 5% by weight, of an unsaturated carboxylic acid, unsaturated dicarboxylic acid, or esters and/or anhydrides thereof,
        with the amounts of a) through c) totaling 100% by weight, and the percentage of components a)+b1) or a)+b2), with respect to the total amount of the polymer mixture, being 50% by weight or less.

2. Polymer mixture according to claim 1, wherein component a) is an ethylene-vinyl acetate copolymer with a vinyl acetate content of less than about 25% by weight or an ethylene-methacrylate copolymer with a methyl acrylate content of less than about 25% by weight.

3. Polymer mixture according to claim 1, wherein the content in component b1) of monomer (1) is from about 40 to about 80% by weight, and the MFI (190□C, 2.16 kg) of the terpolymer is between from about 0.1 and about 15 g/10 min.

4. Polymer mixture according to claim 1, wherein the component b1) is an ethylene-vinyl acetate-carbon monoxide terpolymer.

5. Polymer mixture according to claim 1, wherein the component b2) is an ethylene-vinyl acetate copolymer with a vinyl acetate content of more than about 35% by weight or an ethylene-methyl acrylate copolymer with a methyl acrylate content of more than about 35% by weight.

6. Polymer mixture according to claim 1, further comprising an ethylene copolymer with a melting point of from about 65$^N$C to about 110$^N$C and/or a density of from about 0.86 g/L to about 0.91 g/L is present in a concentration of less than 30% by weight, with $C_4$- to $C_{12}$-, and preferably $C_4$- to $C_8$-α olefins being present.

7. Polymer mixture according to claim 1, wherein the percentage of component a) with respect to the total mixture is between from about 3 and about 20% by weight, and the percentage of b) with respect to the total mixture is between from about 5 and about 30% by weight.

8. Polymer mixture according to claim 1, wherein component c) is selected from:
    c1) an optionally grafted ethylene homopolymer or copolymer having a density above about 0.910 g/L, and preferably above about 0.920 g/L, and an MFI (190$^N$C, 2.16 kg) of from about 0.1 to about 30 g/10 min, and preferably from about 0.5 to about 10 g/10 min;

c2) an optionally grafted polypropylene from the group of homopolymers and block or random copolymers with $C_2$- or $C_4$- to $C_{12}$-α olefins as comonomers, with the density of the polypropylene being above about 0.90 g/L, the melting point being above about 120°C, and the MFI being between from about 0.1 and about 30 g/10 min (230°C, 2.16 kg);

c3) the group of non-crosslinked or partially or completely crosslinked thermoplastic polyolefin elastomers, containing from about 10 to about 77% by weight of a polypropylene homopolymer or copolymer and from about 23 to about 90% by weight of a copolymer based on ethylene and one or more $C_3$–$C_{12}$-α olefins and/or a non-conjugated diene, as well as mixtures of c1), c2), and/or c3).

9. Polymer mixture according to claim 8, wherein the melting point of the ethylene copolymer is less than about 65 C., the glass transition temperature is less than about −20 C., and in crosslinked systems, the gel content is from about 5 to about 50%.

10. Polymer mixture according to claim 8, wherein the non-conjugated diene comprises linear aliphatic dienes, alkylidenes, bicycloalkenes, alkenyl bicycloalkenes, bicycloalkadienes, and alkenyl cycloalkenes.

11. Polymer mixture according to claim 1, further comprising from about 1 to about 10% by weight of an aliphatic and/or napthenic processing aid and wherein said processing aid is liquid at room temperature and takes on a waxlike consistency only at temperatures of less than about 0 C.

12. Sheet or molded piece containing the polymer mixture according to claim 1.

13. Sheet or molded piece according to claim 12, wherein the sheet or molded piece is present in crosslinked form after molding or is subsequently crosslinked.

14. Sheet or molded piece according to claim 13, wherein after crosslinking, the total gel content is between from about 5 and about 80%.

15. Polymer mixture according to claim 2, characterized in that the content in component b1) of monomer (1) is from about 40 to about 80% by weight, and the MFI (190 C., 2.16 kg) of the terpolymer is between from about 0.1 and about 15 g/10 min.

16. Polymer mixture according to claim 9, wherein the non-conjugated diene comprises linear aliphatic dienes, alkylidenes, bicycloalkenes, alkenyl bicycloalkenes, bicycloalkadienes, and alkenyl cycloalkenes.

17. Polymer mixture according to claim 11, wherein the processing aid is present in an amount from about 1 to about 5% by weight and wherein said processing aid is liquid at room temperature and takes on a waxlike consistency only at temperatures of less than about 0 C.

18. Polymer mixture according to claim 1, wherein the content in component b1) of monomer (1) is from about 50 to about 75% by weight, and the MFI (190 C., 2.16 kg) of the terpolymer is between from about 0.1 and about 15 g/10 min.

19. Polymer mixture according to claim 1, wherein the content in component b1) of monomer (2) is from about 10 to about 50% by weight, and the MFI (190 C., 2.16 kg) of the terpolymer is between from about 0.1 and about 15 g/10 min.

20. Polymer mixture according to claim 1, wherein the content in component b1) of monomer (2) is from about 15 to about 35% by weight, and the MFI (190 C., 2.16 kg) of the terpolymer is between from about 0.1 and about 15 g/10 min.

21. Polymer mixture according to claim 1, wherein the content in component b1) of monomer (3) is from about 2 to about 15% by weight, and the MFI (190 C., 2.16 kg) of the terpolymer is between from about 0.1 and about 15 g/10 min.

22. Polymer mixture according to claim 1, wherein the content in component b1) of monomer (3) is from about 3 to about 12% by weight, and the MFI (190 C., 2.16 kg) of the terpolymer is between from about 0.1 and about 15 g/10 min. between from about 0.5 and about 10 g/10 min.

23. Polymer mixture according to claim 1, wherein the content in component b1) of monomer (1) is from about 40 to about 80% by weight, and the MFI (190 C., 2.16 kg) of the terpolymer is between from about 0.5 and about 10 g/10 min.

24. Polymer mixture according to claim 1, wherein the content in component b1) of monomer (1) is from about 50 to about 75% by weight, and the MFI (190 C., 2.16 kg) of the terpolymer is between from about 0.5 and about 10 g/10 min.

25. Polymer mixture according to claim 1, wherein the content in component b1) of monomer (2) is from about 10 to about 50% by weight, and the MFI (190 C., 2.16 kg) of the terpolymer is between from about 0.5 and about 10 g/10 min.

26. Polymer mixture according to claim 1, wherein the content in component b1) of monomer (2) is from about 15 to about 35% by weight, and the MFI (190 C., 2.16 kg) of the terpolymer is between from about 0.5 and about 10 g/10 min.

27. Polymer mixture according to claim 1, wherein the content in component b1) of monomer (3) is from about 2 to about 15% by weight, and the MFI (190 C., 2.16 kg) of the terpolymer is between from about 0.5 and about 10 g/10 min.

28. Polymer mixture according to claim 1, wherein the content in component b1) of monomer (3) is from about 3 to about 12% by weight, and the MFI (190 C., 2.16 kg) of the terpolymer is between from about 0.5 and about 10 g/10 min.

29. Polymer mixture according to claim 1, wherein the percentage of component a) with respect to the total mixture is between from about 3 and about 20% by weight, and the percentage of b) with respect to the total mixture is between from about 5 and about 25% by weight.

30. Polymer mixture according to claim 1, wherein the percentage of component a) with respect to the total mixture is between from about 5 and about 15% by weight, and the percentage of b) with respect to the total mixture is between from about 5 and about 30% by weight.

31. Polymer mixture according to claim 1, wherein the percentage of component a) with respect to the total mixture is between from about 5 and about 15% by weight, and the percentage of b) with respect to the total mixture is between from about 5 and about 25% by weight.

32. Polymer mixture according to claim 8, wherein the melting point of the ethylene copolymer is less than about 65°C, the glass transition temperature is less than about −20 C., and in crosslinked systems, the gel content is from about 5 to 40%.

33. Sheet or molded piece according to claim 13, wherein after crosslinking, the total gel content is between from about 10 and about 70%.

34. Polymer mixture according to claim 2, characterized in that the content in component b1) of monomer (1) is from about 50 to about 75% by weight, and the MFI (190 C., 2.16 kg) of the terpolymer is between from about 0.1 and about 15 g/10 min.

35. Polymer mixture according to claim 2, characterized in that the content in component b1) of monomer (2) is from about 10 to about 50% by weight and the MFI (190 C., 2.16 kg) of the terpolymer is between from about 0.1 and about 15 g/10 min.

36. Polymer mixture according to claim 2, characterized in that the content in component b1) of monomer (2) is from about 15 to about 35% by weight, and the MFI (190 C., 2.16 kg) of the terpolymer is between from about 0.1 and about 15 g/10 min.

37. Polymer mixture according to claim 2, characterized in that the content in component b1) of monomer (3) is from about 2 to about 15% by weight, and the MFI (190 C., 2.16 kg) of the terpolymer is between from about 0.1 and about 15 g/10 min.

38. Polymer mixture according to claim 2, characterized in that the content in component b1) of monomer (3) is from about 3 to about 12% by weight, and the MFI (190 C., 2.16 kg) of the terpolymer is between from about 0.1 and about 15 g/10 min.

39. Polymer mixture according to claim 2, characterized in that the content in component b1) of monomer (1) is from about 40 to about 80% by weight, and the MFI (190 C., 2.16 kg) of the terpolymer is between from about 0.5 and about 10 g/10 min.

40. Polymer mixture according to claim 2, characterized in that the content in component b1) of monomer (1) is from about 50 to about 75% by weight, and the MFI (190 C., 2.16 kg) of the terpolymer is between from about 0.5 and about 10 g/10 min.

41. Polymer mixture according to claim 2, characterized in that the content in component b1) of monomer (2) is from about 10 to about 50% by weight and the MFI (190 C., 2.16 kg) of the terpolymer is between from about 0.5 and about 10 g/10 min.

42. Polymer mixture according to claim 2, characterized in that the content in component b1) of monomer (2) is from about 15 to about 35% by weight, and the MFI (190 C., 2.16 kg) of the terpolymer is between from about 0.5 and about 10 g/10 min.

43. Polymer mixture according to claim 2, characterized in that the content in component b1) of monomer (3) is from about 2 to about 15% by weight, and the MFI (190 C., 2.16 kg) of the terpolymer is between from about 0.5 and about 10 g/10 min.

44. Polymer mixture according to claim 2, characterized in that the content in component b1) of monomer (3) is from about 3 to about 12% by weight, and the MFI (190 C., 2.16 kg) of the terpolymer is between from about 0.5 and about 10 g/10 min.

45. An article comprising one of an air bag cover, roof lining, head rest, arm strap, hat rack, seat and back cushion cover, rear covering of front seats, sun visor, floor protector, door covering, or cargo space cover, a trunk lining and book binding formed of the flexible polymer mixture of claim 1.

46. A cargo space cover comprising an upper and a lower sheet, a support line between them, and optionally, additional sheets and layers, wherein the upper and lower sheets contain the polymer mixture of claim 1.

* * * * *